US011163887B2

(12) United States Patent
Tuttle et al.

(10) Patent No.: US 11,163,887 B2
(45) Date of Patent: Nov. 2, 2021

(54) CLEARANCE OF BARE METAL RESOURCE TO TRUSTED STATE USABLE IN CLOUD COMPUTING

(71) Applicant: Microsoft Technology Licensing, LLC, Redmond, WA (US)

(72) Inventors: Bryan W. Tuttle, Newcastle, WA (US); Carlos Jose Cela, Seattle, WA (US); Ho-Yuen Chau, Bellevue, WA (US); Melur K. Raghuraman, Sammamish, WA (US); Saurabh M. Kulkarni, Redmond, WA (US); Yimin Deng, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 159 days.

(21) Appl. No.: 16/235,771

(22) Filed: Dec. 28, 2018

(65) Prior Publication Data
US 2019/0251266 A1 Aug. 15, 2019

Related U.S. Application Data

(60) Provisional application No. 62/630,534, filed on Feb. 14, 2018.

(51) Int. Cl.
*G06F 21/00* (2013.01)
*G06F 21/57* (2013.01)
*G06F 21/55* (2013.01)
*G06F 9/4401* (2018.01)
*G06F 21/74* (2013.01)

(52) U.S. Cl.
CPC .......... *G06F 21/575* (2013.01); *G06F 9/4401* (2013.01); *G06F 21/55* (2013.01);
(Continued)

(58) Field of Classification Search
CPC ...... G06F 21/575; G06F 21/572; G06F 21/55; G06F 9/4401; G06F 2221/034;
(Continued)

(56) References Cited

U.S. PATENT DOCUMENTS 8,381,021 B2   2/2013  Howard et al.
8,621,460 B2  12/2013  Evans et al.
(Continued)

FOREIGN PATENT DOCUMENTS

WO      02073438 A1    9/2002

OTHER PUBLICATIONS

"International Search Report and Written Opinion Issued in PCT Application No. PCT/US19/012412", dated Mar. 29, 2019, 11 Pages.
(Continued)

*Primary Examiner* — Ellen Tran
*Assistant Examiner* — Helai Salehi
(74) *Attorney, Agent, or Firm* — Mannava & Kang, P.C.

(57) ABSTRACT

A bare metal resource includes a trusted portion and an untrusted portion. The trusted portion includes trusted hardware, an image repository, and a clearance manager. The clearance manager is executable during bootup of the bare metal resource to perform a clearance process on the untrusted portion, including deleting the BIOS in the untrusted portion and loading a trusted BIOS from the image repository on the untrusted hardware, to place the untrusted portion in a trusted state. The bare metal resource may be provisioned to a tenant of a cloud provider after being placed in the trusted state.

20 Claims, 5 Drawing Sheets

(52) U.S. Cl.
CPC ............ *G06F 21/572* (2013.01); *G06F 21/74* (2013.01); *G06F 2221/034* (2013.01); *G06F 2221/2105* (2013.01); *G06F 2221/2143* (2013.01)

(58) Field of Classification Search
CPC ......... H04L 29/06911; H04L 29/06925; H04L 29/06931; H04L 29/06938
See application file for complete search history.

(56) References Cited

U.S. PATENT DOCUMENTS

| | | | |
|---|---|---|---|
| 9,230,112 | B1 | 1/2016 | Peterson et al. |
| 9,329,941 | B2 | 5/2016 | Liu et al. |
| 11,050,635 | B2 * | 6/2021 | Franke .................... H04L 41/28 |
| 2016/0180099 | A1 * | 6/2016 | Potlapally ............. H04L 9/0838 713/189 |
| 2016/0328300 | A1 * | 11/2016 | Rahardjo ............ G06F 11/1469 |
| 2017/0213034 | A1 | 7/2017 | Sarangdhar et al. |
| 2017/0249002 | A1 | 8/2017 | Costa et al. |
| 2017/0310700 | A1 | 10/2017 | Cudak et al. |
| 2018/0075242 | A1 * | 3/2018 | Khatri ................... H04L 9/3263 |
| 2018/0165455 | A1 * | 6/2018 | Liguori ................. G06F 9/4416 |

OTHER PUBLICATIONS

Kirat, et al., "BareBox: Efficient Malware Analysis on Bare-Metal", In Proceedings of the 27th Annual Computer Security Applications Conference, Dec. 5, 2011, 10 Pages.

\* cited by examiner

CLEARANCE OF BARE METAL RESOURCE TO TRUSTED STATE USABLE IN CLOUD COMPUTING

PRIORITY

The present application claims priority to U.S. provisional patent application Ser. No. 62/630,534, filed Feb. 14, 2018, which is incorporated by reference in its entirety.

BACKGROUND

Cloud computing typically involves the delivery of computing services, which may involve servers, storage, databases, networking, software, etc., over the Internet. Companies offering these computing services are called cloud providers and typically charge for cloud computing services based on usage.

Often, cloud providers use virtualization to implement a reusable pool of computing resources that can be assigned to different tenants. Virtualization is a technology that separates physical infrastructure to create various dedicated resources, such as virtual machines (VMs), that can run different instances of operating systems and applications on the same server. Using server virtualization, cloud providers can maximize the use of server resources and reduce the number of servers required. Also, VMs may run as separate, isolated units, thus providing fault and security isolation. Cloud providers may rely on virtualization technology to protect hardware from various intrusive attacks, such as attacks caused by firmware malware, bios-level hypervisor attacks, BIOS (basic input/output system)/firmware overwrite and denial of service attacks. Commonly, non-volatile memory modules on a system board are the target for such attacks, because targeting the non-volatile memory allows an attack to persist across a system power cycle. Virtualization may aid in isolating the non-volatile memory modules from such attacks.

For improved performance, cloud computing tenants are increasingly demanding bare-metal access to the latest high-performance hardware and/or accelerators for workloads, such as artificial intelligence or machine learning workloads, in the cloud. Bare-metal access may include providing a tenant with access to a single-tenant physical server, instead of a VM. Bare-metal access may allow a tenant to access the hardware on the bare metal server, such as to install custom drivers or firmware.

It can be challenging for cloud providers to provide bare-metal access of servers to tenants. For example, there may be challenges in maintaining security of bare-metal servers without having a virtualization layer to isolate the hardware from attacks. Also, unlike a VM, which can be terminated by the hypervisor after it is done being used by a tenant, there is no efficient, automated mechanism to wipe a bare metal server after it is done being used by a tenant.

BRIEF DESCRIPTION OF DRAWINGS

Embodiments and examples are described in detail in the following description with reference to the following figures. The embodiments are illustrated by examples shown in the accompanying figures in which like reference numerals indicate similar elements.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Figure 1:
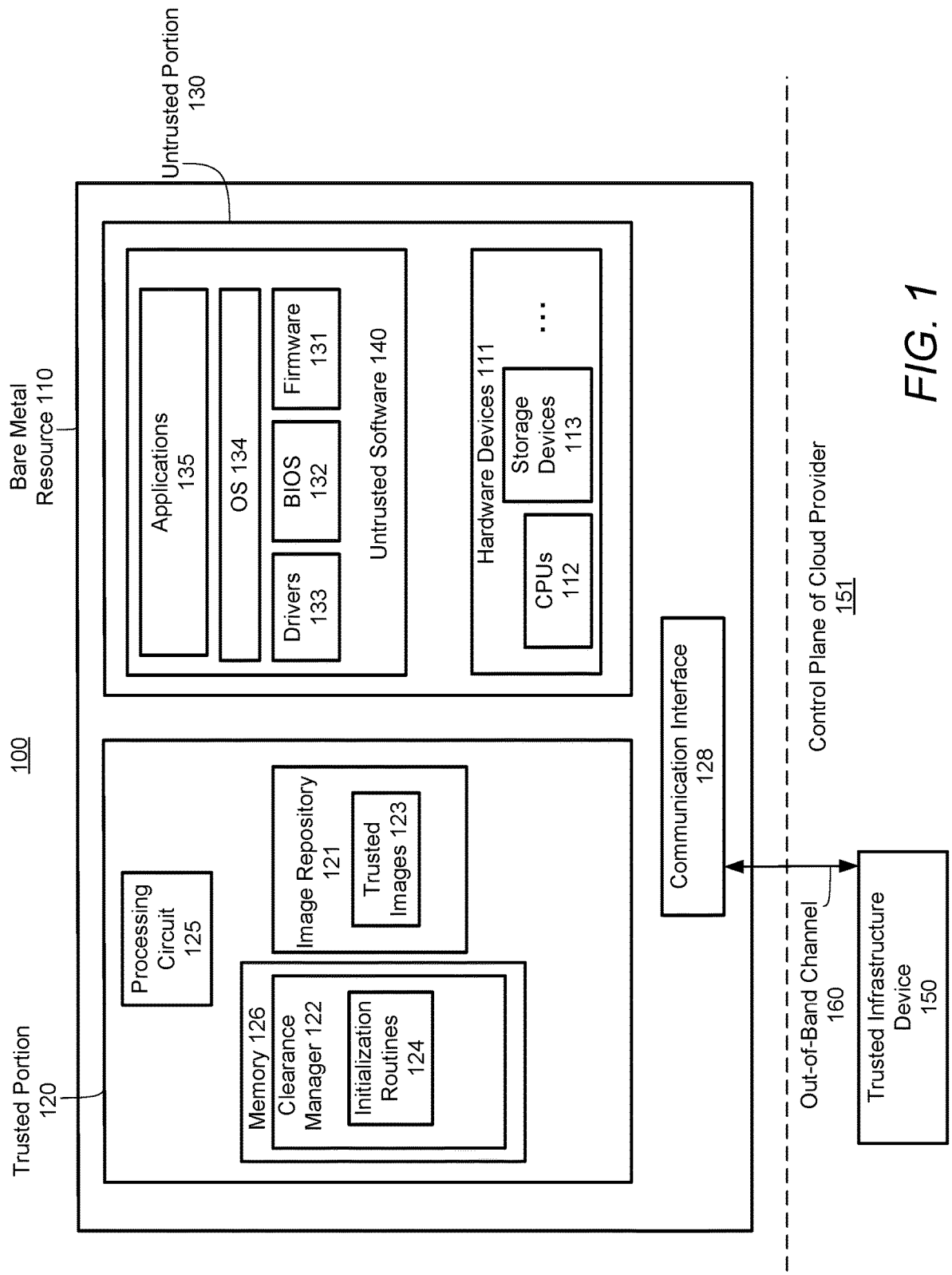
FIG. 1 illustrates a system including a bare metal resource and a trusted infrastructure device, according to an embodiment.

According to embodiments of the present disclosure, hardware and methods are described that enable provisioning re-assignable bare metal computer resources. The provisioning may be performed in a cloud computing environment by a cloud provider for cloud computing tenants. FIG. 1 shows a system 100 that includes a bare metal resource 110 and trusted infrastructure device 150, according to an embodiment. The bare metal resource 110 may also be referred to as a bare metal server or a bare metal machine. The bare metal resource 110 includes a physical server as opposed to a virtual server. In an example, the bare metal resource 110 is allocated to a single tenant (e.g., dedicated to only the single tenant) in a cloud computing environment and the tenant can configure the bare metal resource 110 as needed.

The bare metal resource 110 has a motherboard including hardware devices 111. The hardware devices 111 may include CPUs 112, storage devices 113 and other hardware not shown. For example, the hardware devices 111 may include one or more of a field-programmable gate array (FPGA), graphics processing unit (GPU), host bus adapter (HBA), non-volatile memory express (NVMe) flash memory, solid state devices (SSDs), hard disk drives (HDDs), central processing unit (CPU), dynamic random-access memory (DRAM), etc. In an example, the bare metal resource 110 may include a server motherboard comprising an x86 platform (e.g., with single or dual socket CPU boards) and peripheral component interconnect express (PCIe) attached device(s), such as a field programmable array (FPGA), a network interface controller (NIC), an Ethernet NIC, clock and power circuits. The bare metal resource 110 may be a blade server that can be placed in a rack, which may be provided in a data center. The bare metal resource 110 may be in compliance with data center requirements. One example is that the bare metal resource is a blade-chassis design, with the chassis being 4U in height and housing 4-6 vertically inserted blades. The bare metal resource 110 may be provided as part of a bare metal offering of a cloud provider, such as part of an Infrastructure as a Service (IaaS) or another type of service made available to cloud computing tenants by a cloud provider.

The bare metal resource 110 may include a trusted portion 120 and an untrusted portion 130. The trusted portion 120, for example, refers to hardware and software of the bare metal resource 110 that is inaccessible by a tenant and may not be configured by a tenant. The untrusted portion 130, for example, refers to hardware and software that is accessible by a tenant and may be configurable by the tenant, such as when the bare metal resource 110 is provisioned to the tenant.

The trusted portion 120 may include hardware and software that performs a clearance process on the bare metal resource 110 to place the bare metal resource 110 in a trusted state. The trusted state may be a configuration of the bare metal resource 110 that is known to operate correctly. For example, the configuration of the bare metal resource 110 in the trusted state is tested before implementation to determine that it operates without failure. The clearance process may be used to return the bare metal resource to the trusted state, such as in case of a security breach, or when reassigning the bare metal resource 110 to a different tenant, or when the bare metal resource 110 fails, which may be caused by faulty, tenant-loaded software.

The trusted portion 120 includes hardware devices. For example, the trusted portion 120 includes a processing circuit 125 and memory 126. The processing circuit 125 may include a microcontroller, CPU, FPGA, Application-Specific Integrated Circuit (ASIC), etc., that runs firmware, such as clearance manager 122, that performs the clearance process. The clearance manager 122 may include initialization routines 124 that perform the operations of the clearance process described below. In an example, the clearance manager 122 may run a power-on self-test (POST), including the initialization routines 124, responsive to a special hard boot, to execute the clearance process.

The trusted portion 120 includes an image repository 121 storing trusted images 123. The image repository 121 may be stored in a storage device on the trusted portion 120, which may include non-volatile memory. The trusted images 123 may be loaded onto the untrusted portion 130 during the clearance process.

The trusted images 123 in the image repository 121 include known good images of firmware or other types of software, such as trusted images for drivers, firmware, BIOS, OS, and images for key boot critical components, including baseboard management controller (BMC), NIC and basic input/output (I/O) devices, etc. A known good image may be an image that is known to work without defects on the platform that it is loaded. The image repository 121 may store multiple versions of images. For example, the trusted image repository 121 stores a tenant-facing, full read-and-write-access working image, a Last-known-Good (LKG) image, and an image for key boot critical components. These images, for example, are known good images, and one or more of these images are loaded into the untrusted portion 130 during the clearance process as is discussed below.

The trusted portion 120 and the untrusted portion 130 may be on the same motherboard of the bare metal resource 110. For example, the trusted portion 120 may be a chip or chipset on the motherboard or the trusted portion 120 may be a card pluggable in a slot on the motherboard. The trusted portion 120 is not accessible by the tenant renting the bare metal resource 110 and is not visible to the untrusted portion 130 when the untrusted portion 130 is being used by the tenant, such as after the clearance process is performed and the bare metal resource 110 is provisioned to the tenant.

The untrusted portion 130 may include untrusted software 140 and hardware devices 111. The untrusted software 140 may include firmware 131, BIOS 132, drivers 133, operating system (OS) 134, applications 135, etc., which the tenant can access, remove, add or modify. Firmware 131 and drivers 133 may include firmware and drivers used by devices on the bare metal resource 110. For example, the firmware 131 may include firmware of a baseboard management controller on the bare metal resource 110. The drivers 133 may include drivers for a video card or a network interface controller (NIC) on the bare metal resource 110. For example, after the bare metal resource 110 is provisioned to a tenant, the tenant may install and run custom applications on the bare metal resource 110. The tenant may also install a new OS, or a new BIOS or new drivers on the bare metal resource 110 so as to configure the bare metal resource to best service their computing demands. The untrusted software 140 may be stored in the storage devices 113 of the hardware devices 111. Also, the untrusted software 140 may be executed by the CPUs 112 or other processing circuits of the hardware devices 111. Generally, the hardware devices 111 and untrusted software 140 may be accessed and configured by the tenant after the clearance process is performed and after the bare metal resource 110 is provisioned to the tenant.

The bare metal resource 110 may include one or more communication interfaces. For example, the hardware devices 111 may include an NIC for communicating over an in-band network. Also, the bare metal resource 110 may include a communication interface 128 for communicating with a control plane 151 of the cloud provider via an out-of-band channel 160. The communication interface 128 may be a separate NIC from an NIC for communicating over an in-band network or it may be the same NIC that is multiplexed. In another example, the communication interface 128 may include a system board interface, which may include Dual-In-Line Plug (DIP) connectors and/or general-purpose input/output (GPIO), that connects through wires to a trusted infrastructure device 150 in the control plane 151 via the out-of-band channel 160.

The trusted infrastructure device 150 may be part of the control plane 151 of the cloud computing environment and is operable to send instructions or signal the bare metal resource 110 to execute the clearance process and perform other functions. The control plane 151 may be used for administrative traffic and provisioning resources to tenants rather than for carrying tenant data. The trusted infrastructure device 150 may invoke the clearance process and initiate provisioning and recovery from failure for the bare metal resource 110. Also, the trusted infrastructure device 150 may access the bare metal resource 110 to perform other management functions such as resource management, ongoing health monitoring, billing, etc. In an example, the trusted infrastructure device 150 is part of a rack controller that can access bare metal resources in the rack to perform the clearance process and other management functions. In another example, the trusted infrastructure device 150 may be a network management device in the control plane 151 that communicates via an out-of-band network (wired and/or wireless), including out-of-band channel 160, with bare metal resources in the cloud to execute the clearance process and provision the bare metal resources to individual tenants.

As indicated above, the trusted infrastructure device 150, for example, is communicatively coupled to the bare metal resource 110 via out-of-band channel 160. The out-of-band channel 160 is out-of-band with respect to the networks of the cloud that store and carry tenant data, and the out-of-band channel 160 is inaccessible to the tenants. The out-of-band channel 160 may be a secure connection through a communication medium, such as Ethernet or via a secure/private interconnect, such as general-purpose input/output (GPIO), or through another communication medium.

In an example, the trusted infrastructure device 150 is connected to the trusted portion 120 across GPIOs and/or across dual in-line package (DIP) switches. The DIP switches can enable or disable a particular GPIO if needed. To invoke the clearance process, the trusted infrastructure device 150 may control the appropriate GPIO pins so the bare metal resource 110 boots from the trusted portion 120 instead of the untrusted portion 130. Then, after the clearance process is completed, the trusted infrastructure device 150 may control the appropriate GPIO pins so the bare metal resource 110 boots from the untrusted portion 130, and the bare metal resource 110 is ready for tenant use.

In an example, a tenant of the cloud provider may subscribe to a bare metal IaaS offering of the cloud provider, and rent a bare metal resource. The cloud provider may provide access to the bare metal resource 110 as part of the IaaS. Before providing the tenant with access to the bare metal resource 110, a clearance process is performed on the bare metal resource 110. The clearance process may wipe a persistent state of the hardware devices 111 in the untrusted portion 130. This may include deleting any data or machine readable instructions left by the tenant (or a previous tenant) on the untrusted portion 130, and may include restoring the hardware devices 111 to a known good persistent state (i.e., a trusted state). This may include wiping all storage devices, such as deleting tenant data, firmware, applications, etc., from the storage devices 113. This may further include restoring firmware on the hardware devices 111 (e.g., a network card, NVMe drive, or any other devices attached to the motherboard likely having firmware in them) to a trusted state; restoring a persistent state on the motherboard of the bare metal resource 110 to a trusted state (e.g., a complementary metal-oxide-semiconductor (CMOS) real-time clock in the motherboard may have some persistent memory available, such as a battery backed-up random-access memory (RAM), that a user may write data to and can be considered a state that may be left over if not cleared, allowing an attacker to do things like identifying if they have been in that machine before); and restoring a BIOS to a trusted stated if the BIOS has changed. The clearance process may include loading known good images from the image repository 121 of the trusted portion 120 to the untrusted portion 130. Generally, to restore to the trusted state, the system 100 checks the persistent state in the hardware devices 111 that may be accessible by the tenant and if a change is detected, the state is set to a valid state, such as a known good value. Also, data and software are wiped and known good images are loaded on the untrusted portion 130. After the clearance process is completed, the bare metal resource 110 is then assigned to the tenant, and the tenant is provided with access to the bare metal resource 110, such as through a secure network channel of an in-band network. The tenant may then configure the untrusted portion 130 as needed, such as by loading a new BIOS, firmware, OS, drivers, applications, etc., on the hardware devices 111 of the untrusted portion 130. The tenant cannot access the trusted portion 120 of the bare metal resource 110 at any time.

The clearance process may be performed in various situations including for both hardware-reclaim-after-lease and tenant recovery support scenarios. For example, if the bare metal resource 110 does not boot due to a bug or due to a malicious user, the clearance process may be triggered. If the bare metal resource 110 is being returned to a pool of the bare metal resources that is made available for tenant use, the clearance process may be triggered. For example, the clearance process may be initiated when a tenant vacates the bare metal resource 110 before handing it over to the next tenant.

Figure 2:
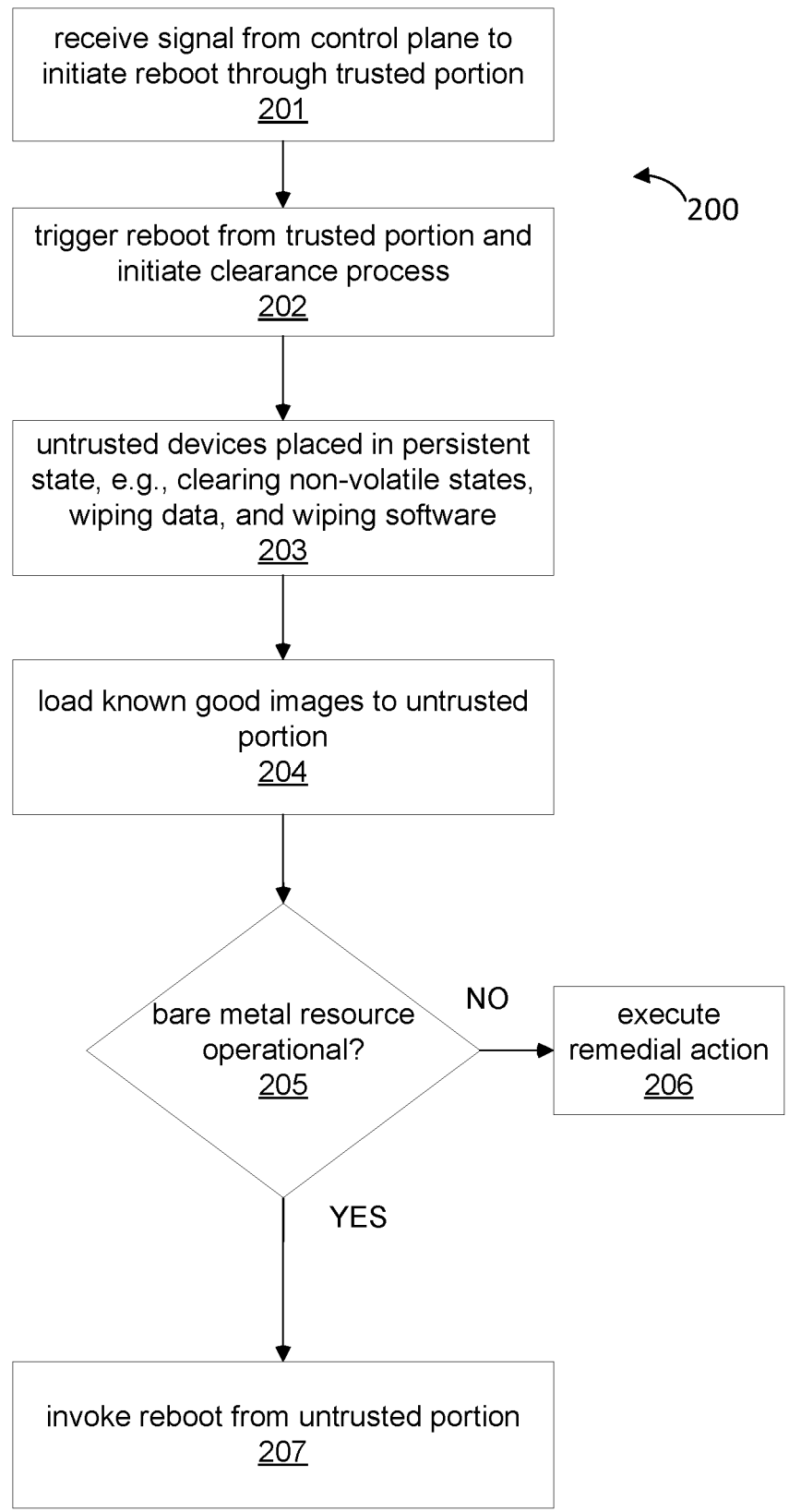
FIG. 2 shows a method of initiating and executing a clearance process, according to an embodiment.

FIG. 2 shows a method 200 of initiating and executing the clearance process, according to an embodiment. At 201, the bare metal resource 110 receives a signal from the control plane 151 of the cloud provider, and at 202, a reboot of the bare metal resource 110 is triggered from the trusted portion 120 responsive to the received signal. In an example, a reboot of the bare metal resource 110 is initiated by the control plane 151 sending a signal via an out-of-band network to execute the reboot from the trusted portion 120. The signal may be an interrupt generated on the bare metal resource 110 via out-of-band channel 160 to execute the reboot from the trusted portion 120. For example, the trusted infrastructure device 150 may send signals to appropriate GPIO pins of the bare metal resource 110 connected to the trusted infrastructure device 150. The signals may be sent in a particular sequence to initiate the reboot. The GPIO pins may be on the motherboard of the bare metal resource 110. In one configuration, the signaling may include sending an interrupt for a special hard boot that causes a CPU in the untrusted portion 130 to execute the reboot from the trusted portion 120. In another configuration, a server power cycle may be initiated that causes a reboot from the trusted portion 120.

A The bare metal resource may be rebooted in special mode to cause the reboot from the trusted portion 120. For example, a CPU in the trusted portion 120 stores the location of the clearance manager 122 and calls the clearance manager 122 from the memory 126 for the special mode reboot. The clearance manager 122 may execute a POST in response to the hard reboot caused by the trusted infrastructure device 150. The POST may include execution of initialization routines 124 to perform operations of the clearance process which are further discussed below. In an example, the clearance manager 122 may include low level firmware stored in the memory 126. The memory 126 may be non-volatile memory.

Also, at 202, the reboot from the trusted portion 120 initiates the clearance process. For example, a reboot is initiated from the trusted portion 120 instead of the untrusted portion 130. The clearance manager 122 executes the initialization routines 124 to perform one or more of the clearance operations.

Examples of clearance operations performed during the clearance process are now described. For example, at 203, the untrusted devices 111b in the untrusted portion 130 are placed in a persistent state. As another example, the clearance process may include an incremental boot process performed via clearance manager 122 in the memory 126 of the trusted portion 120. The incremental boot process places the untrusted devices 111b in the untrusted portion 130 in the persistent state. For example, the incremental boot process clears non-volatile states of the untrusted devices 111b that are stored in non-volatile memory. This may include setting stored state values for the untrusted devices 111b to valid default values. For example, a state of a Real-Time Clock (RTC) is to a valid default state value. Also, all tenant data stored in volatile or non-volatile storage devices in the untrusted portion 130 is wiped, and all persistent data in any other devices is set to a known good state. Furthermore, untrusted software in the untrusted portion 130 is wiped. For example, BIOS 132, firmware 131, drivers 133, OS 134, applications 135, etc. that are stored in the untrusted portion 130 are wiped. These operations may be part of a power-on self-test executed by the BIOS.

At 204, the clearance manager 122 loads known good images from the image repository 121 to the untrusted portion 130 to operate as the working images on the untrusted portion 130. The known good images may be loaded from the image repository 121 to the untrusted portion 130, including images for the firmware 131, the BIOS 132, drivers 133, and OS 134. The trusted portion 120 may include a trusted image repository 121 storing trusted images 123 comprising known good images of firmware or software. A known good image may be an image that is known to work without defects on the platform that it is loaded. For example, the trusted image repository 121 stores a customer-facing, full read-and-write-access working image, a Last-known-Good (LKG) image, and a golden image for key boot critical components, including BIOS, baseboard management controller (BMC), NIC and basic input/output (I/O) devices that the customer will not have write access to. These images, for example, are known good images, and one or more of these images are loaded into the untrusted portion 130 during the clearance process as is discussed below.

At 205, the trusted infrastructure device 150 verifies whether the clearance process successfully completed and the bare metal resource 110 is operational. This may include executing memory tests and performing other tests on other devices of the hardware devices 111 during POST. Error codes may be generated if any of the verification tests fail, and the error codes may be stored in predetermined locations of the memory 126. If verification fails, then one or more remedial actions may be performed at 206. For example, a system administrator may be notified and/or the clearance manager 122 may execute the clearance process again but may load fail-safe images from the image repository 121 to the hardware devices 111. The fail-safe images may include basic boot images, and after the fail-safe images are loaded, then the trusted infrastructure device 150 verifies whether the bare metal resource 110 is operational. If the bare metal resource 110 is still not operational, then the administrator may be notified.

In yet another example of verifying completion of the clearance process, the trusted infrastructure device 150 detects forward progress in the boot sequence (or lack thereof) during the reboot from the trusted portion 120. Determining progress of the boot sequence may be performed by storing the predetermined sequence of operations for the boot sequence, and determining which operations have completed. In an example, the clearance manager 122 may write values to predetermined registers in the memory 126 that indicate performance of the operations. The trusted infrastructure device 150 may also measure the elapsed time of the clearance process since the sequence began to determine whether the process is stalled. The elapsed time may be measured by a timer or multiple timers for measuring execution of different operations of the clearance process. The trusted infrastructure device 150 may send an alert if it detects that the bare metal resource 110 is not making forward progress in its clearance process. Also, the trusted infrastructure device 150 and/or the clearance manager 122 may determine how far the clearance process completed before crashing and may invoke operations based on how far the clearance has completed. For example, steps in the clearance process that were successfully completed before the clearance process failed may be skipped when the clearance process is restarted.

At 207, after the trusted infrastructure device 150 verifies the clearance process is completed and the bare metal resource 110 is operational, the trusted infrastructure device 150 invokes a reboot from the untrusted portion 130. For example, the trusted infrastructure device 150 sends a signal via out-of-band channel 160 that causes a reboot from the untrusted portion 130. In an example, the signal sent at 207 may be an interrupt different from the interrupt sent at 201 to cause the reboot from the trusted portion 120. In response to receiving the signal, the bare metal resource 110 boots from the BIOS 132 (which at this point is a trusted BIOS loaded from the image repository 121) in the untrusted portion 130. For example, the trusted infrastructure device 150 may set particular GPIO pins in a sequence to generate an interrupt to cause a CPU in the untrusted portion 130 to boot from the BIOS 132, which was copied to the untrusted portion 130 from the image repository 121.

The clearance process may be initiated and executed in an automated manner with no human input. For example, no manual operation is invoked so that a data center technician does not have to be physically present to bring the bare metal resource 110 to a known good state. However, an additional manual recovery trigger mechanism may be provided, such as by using manually flippable jumper pins on the board of the bare metal resource 110, for manual maintenance.

The clearance process may be performed by the processing circuit 125, such as a microcontroller, an FPGA, or a complex programmable logic device (CPLD) executing the clearance manager 122, including a POST loader responsible for basic platform power-up. In an example, the trusted portion 120 may include a chip or chipset (e.g., including FPGA, memory) that is separate from chips on the untrusted portion 130. The trusted portion 120 may include low-level firmware and hardware.

The untrusted and trusted portions 120 and 130 may not be operational simultaneously. For example, the trusted portion 120 is operational during the clearance process, and the untrusted portion 130 is non-operational and non-accessible by a tenant during the clearance process. The trusted portion 120 becomes non-operational after the clearance process is completed, when the untrusted portion 130 is operational and may be accessible by a tenant. The trusted portion 120 may be invisible to the OS 134 running on the untrusted portion 130. For example, the memory 126 in the trusted portion 120, which may be some form of read only memory, may not be mapped during the boot up process performed by the BIOS 132 in the untrusted portion 130, and the trusted portion 120 is invisible to the untrusted portion 130 when the untrusted portion 130 is operational.

As discussed above, the clearance process may be performed in a cloud environment, also referred to as a cloud computing environment, managed by a cloud provider which is further discussed below. However, the clearance process may be executed in other scenarios where a bare metal resource needs to be wiped or needs to be made operational.

Figure 3:
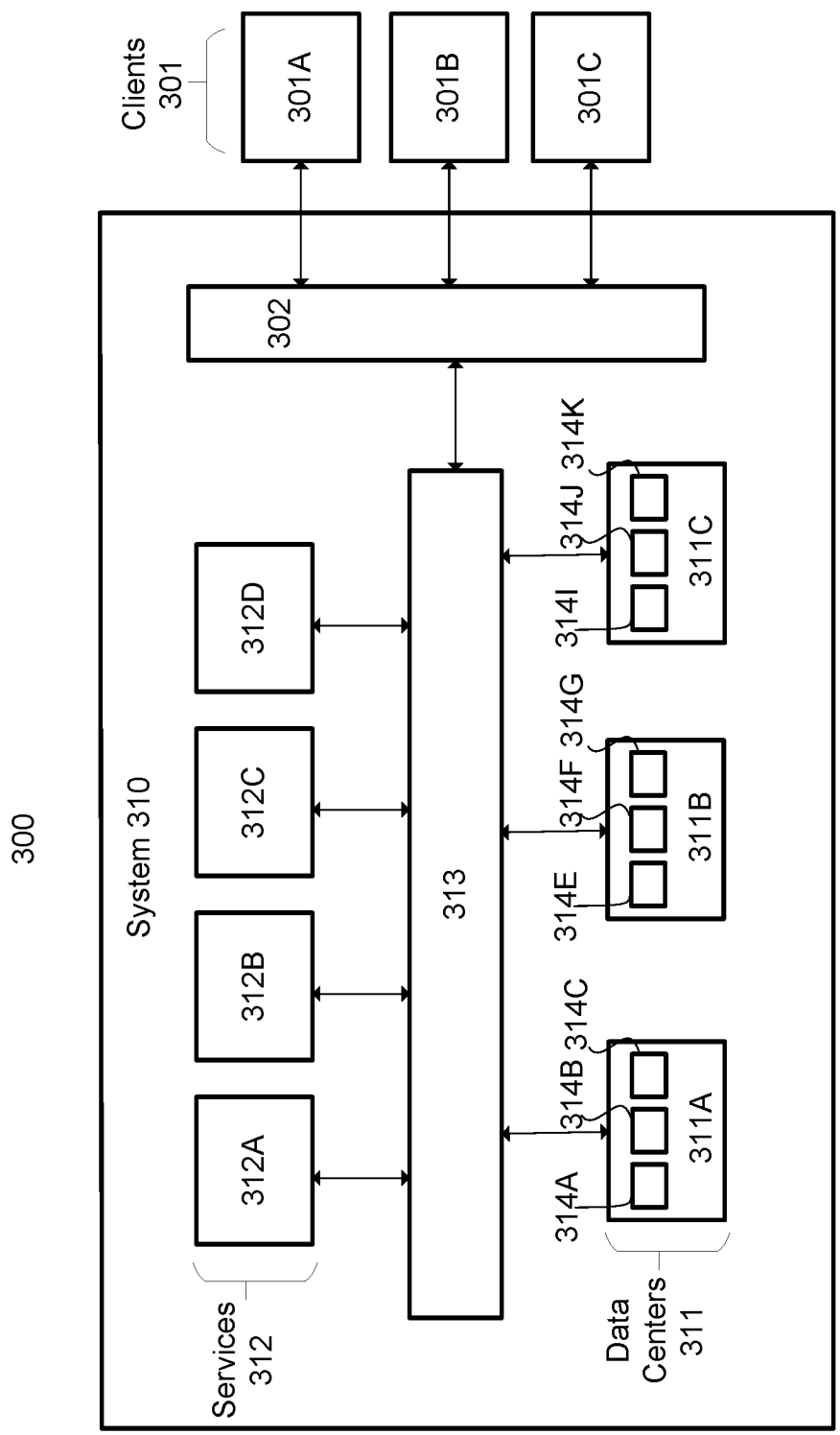
FIG. 3 illustrates a cloud environment in which principles described herein may be employed, according to an embodiment.

FIG. 3 illustrates an environment 300, which may include a cloud environment, in which principles described herein may be employed. The environment 300 includes multiple clients 301 interacting with a system 310 using an interface 303. The environment 300 is illustrated as having three clients 301A, 301B and 301C, although the principles described herein are not limited to this number of clients interfacing with the system 310 through the interface 303. The system 310 may provide services to the clients 301 on-demand and thus the number of clients 301 receiving services from the system 310 may vary over time.

Each client 301 may include a computer, an application and/or other software module that interfaces with the system 310 through the interface 302. The interface 302 may be an application program interface that is defined in such a way that any computing system or software entity that is capable of using the application program interface may communicate with the system 310.

The system 310 may be a distributed system, and in an example is a cloud computing environment. Cloud computing environments may be distributed, although not required, and may even be distributed internationally and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly. Also, the shared pool of configurable computing resources may include bare metal resources, such as the bare metal resource 110 shown in FIG. 1.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The system 310 may include multiple data centers 311. Although the system 310 might include any number of data centers 311, there are three data centers 311A, 311B and 311C illustrated in FIG. 3. There may be as few as one data center, with no upper limit. Furthermore, the number of data centers may be static, or might dynamically change over time as new data centers are added to the system 310, or as data centers are dropped from the system 310.

Each of the data centers 311 includes multiple hosts that provide corresponding computing resources such as processing, memory, storage, bandwidth, and so forth. The data centers 311 may also include physical infrastructure such as network switches, load balancers, storage arrays, and the like.

As illustrated in FIG. 3, the data center 311A includes hosts 314A, 314B, and 314C, the data center 311B includes hosts 314E, 314F, and 314G, and the data center 311C includes hosts 3141, 314J, and 314K. The principles described herein are not limited to an exact number of hosts 314. A large data center 311 will include hundreds or thousands of hosts 314, while smaller data centers will have a much smaller number of hosts 314. The number of hosts 314 included in a data center may be static, or might dynamically change over time as new hosts are added to a data center 311, or as hosts are removed from a data center 311.

In an example, the hosts are capable of running one or more, and potentially many, virtual machines. During operation, the virtual machines emulate a fully operational computing system including at least an operating system, and perhaps one or more other applications as well. Each virtual machine is assigned to a particular client or to a group of clients, and is responsible to support the desktop environment for that client or group of clients and to support the applications running on that client or group of clients. In an example, a virtual machine generates a desktop image or other rendering instructions that represent a current state of the desktop, and then transmits the image or instructions to the client for rendering of the desktop. As the user interacts with the desktop at the client, the user inputs are transmitted from the client to the virtual machine.

In an example, the hosts 314 may include bare metal resources that are provisioned to a tenant after being put into a trusted state by executing the clearance process. Then, the tenant may configure the bare metal resources, such as by loading software, such as applications, an OS, BIOS, etc., on the trusted portions of the bare metal resources, such as shown in FIG. 1. The tenant may configure the bare metal resources to run VMs or may operate the bare metal resources as physical servers without virtualization depending on their needs.

The system 310 also includes services 312. In the illustrated example, the services 312 include five distinct services 312A, 312B, 312C, 312D and 312E, although the principles described herein are not limited to the number of services in the system 310. A service coordination system 313 communicates with the hosts 314 and with the services 312 to thereby provide services requested by the clients 301, and other services (such as authentication, billing, and so forth) that may be prerequisites for the requested service.

Figure 4:
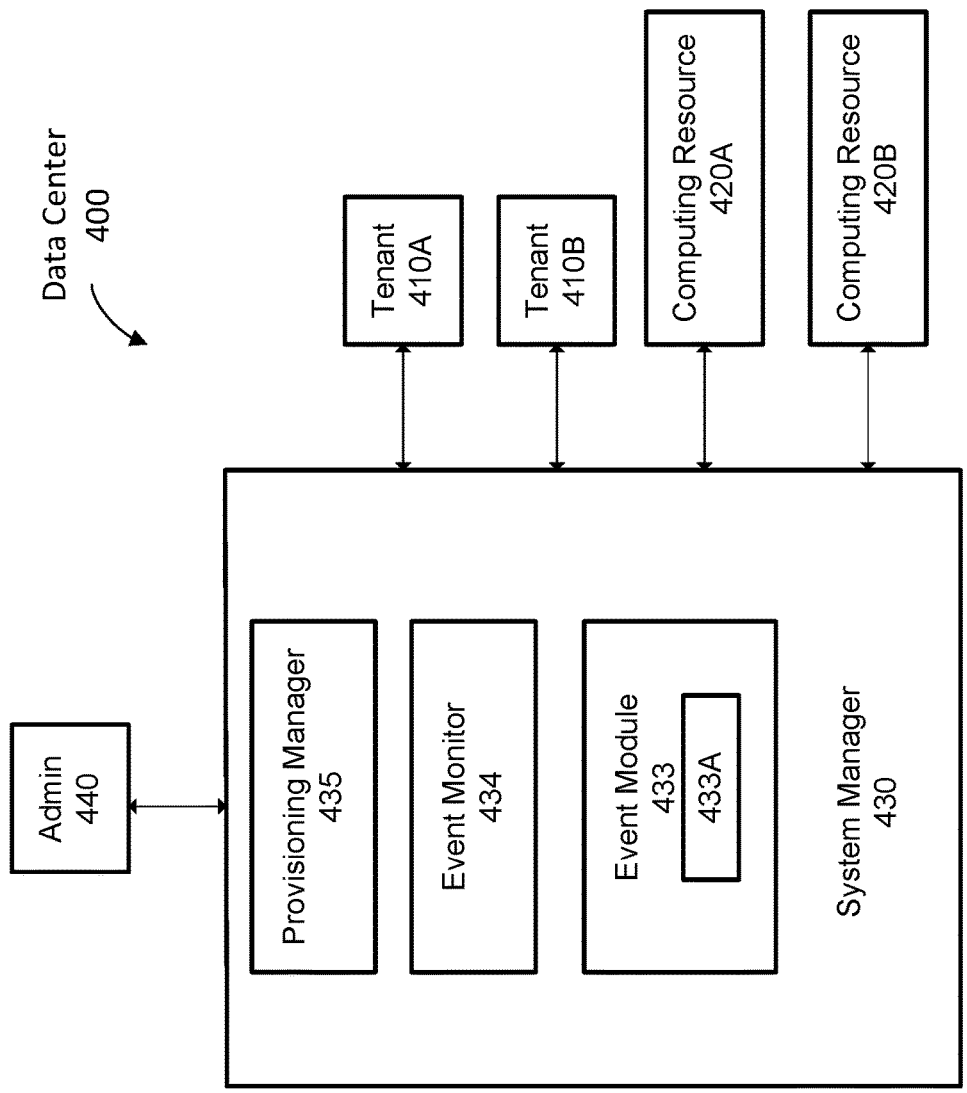
FIG. 4 illustrates a data center in which principles described herein may be employed, according to an embodiment.

FIG. 4 illustrates a data center 400 in which the principles described herein may be employed, according to an embodiment. The data center 400 may correspond to any one of the data centers 311 previously discussed. As illustrated, the data center 400 includes tenants 410A and 410B (hereinafter also referred to as "tenants 410"), but there may be any number of additional tenants. Each tenant 410 represents an entity (or group of entities) that use or have allocated to their use a portion of the computing resources of the data center 400.

The data center 400 also includes computing resources 420A and 420B (hereinafter also referred to as "computing resources 420"), but there may be any number of additional computing resources. The computing resources 420 represent all the physical resources, including bare metal resources, and virtual computing resources of the data center 400 and may correspond to the hosts 314. Examples include servers or hosts, network switches, processors, storage arrays and other storage devices, software components, virtual machines and bare metal resources.

The data center 400 further includes a system manager 430. The system manager 430 manages the interaction between the tenants 410 and the computing resources 420. The system manager 430 may be implemented in a distributed manner or it may be implemented on a single computer system. It will be appreciated that the system manager 430 has access to various processing, storage, and other computing resources of the data center 400 as needed.

The operation of the system manager 430 will be explained in more detail to follow. It will also be appreciated that the various components and modules of the system manager 430 that will be described may also be distributed across multiple hosts 214. Further the system manager 430 may include more or fewer than the components and modules illustrated and the components and modules may be combined as circumstances warrant.

The system manager 430 may configure the relevant computing resources 420 for use by the tenants 410. For example, for a host or server, a predefined resource configuration may include operating system image and customization information, application packages and customization information, Internet Protocol (IP) addresses, media access control (MAC) addresses, world-wide names, and hardware prerequisites for storage, networking, and computing. It will be appreciated that the predefined resource configuration may include additional or different resource configurations. In an example, for bare metal resources, configuration may include storing trusted images in the image repository of the trusted portion and installing the clearance manager.

The system manager 430 may include an event module 433. In operation, the event module 433 allows the administrator 440 to define various event conditions 433A that will enable the computing resources of the data center 400 to generate events that may require the system manager 430 to perform an action, such as applying a resource configuration or executing the clearance process on the bare metal resource, to remediate the condition causing the event. Examples of event conditions 433A may include, but are not limited to, receiving a Dynamic Host Configuration Protocol (DHCP) request from a new sever that has been added to the computing resources 420, on demand capacity expansion based on resource exhaustion (re-active) or forecasted increase in resource utilization (pre-emptive), scale-in of resources based on over allocation of capacity, provisioning bare metal resources, and re-provisioning of failed components, including failed bare metal resources. It will be appreciated that the event conditions 433A need not only be a single event, but may also be a sequence of multiple events.

The system manager 430 may also include an event monitor 434. In operation the event monitor 434 is configured to monitor the tenants 410 and the computing resources 420 for the event conditions 433A that may cause the system manager 430 to take some action. The event monitor 434 may monitor or otherwise analyze performance counters and event logs of the computing resources 420 to determine if the event condition has occurred. In one embodiment, the event monitor 434 may be installed and the system manager 430 may communicate with the computing resources 420 that are being monitored via a control plane. In other embodiments, a computing resource 420 or a tenant 410 may notify the event monitor 434 in an unsolicited fashion that an event condition 433A has occurred, without the need for the event monitor 434 to directly monitor the computing resources.

The system manager 430 also includes a provisioning manager 435. In operation, the provisioning manager 435 may associate a configuration or another action with a specific event condition and its associated policy. This allows the provisioning manager 435 to determine and perform the appropriate action for a particular event, and know to take the action. Also, the provisioning manager 435 performs operations for provisioning new computing resources to tenants, such as when a tenant initially rents a bare metal resource for their use.

Figure 5:
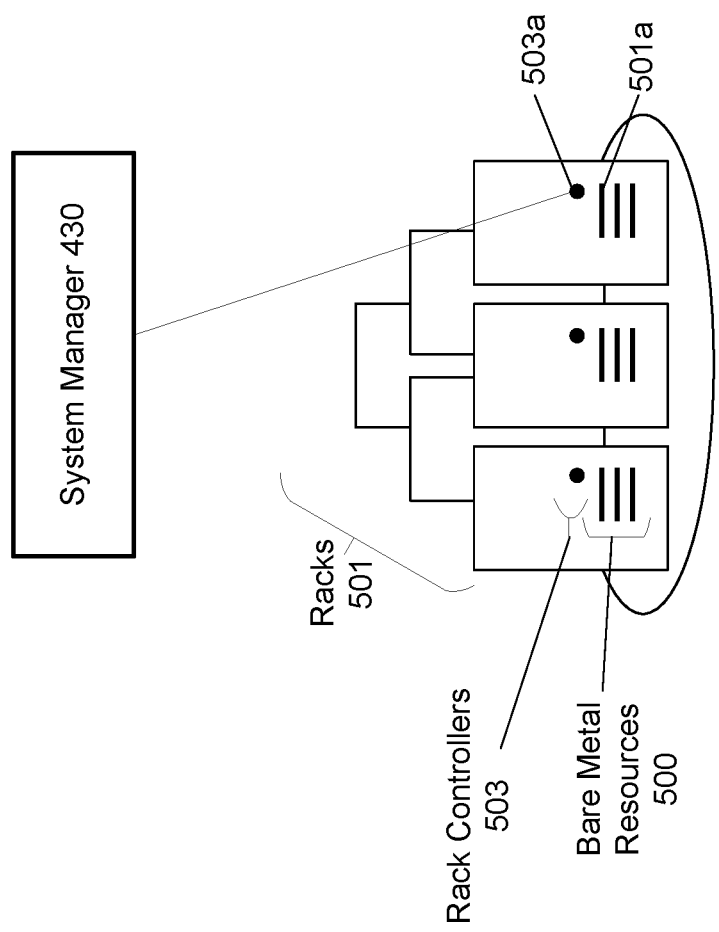
FIG. 5 shows a cloud environment where bare metal resources are provisioned to a tenant, according to an embodiment.

FIG. 5 shows a cloud environment where bare metal resources are provisioned to a tenant, according to an embodiment. For example, bare metal resources 500, including bare metal resource 500a, may be housed in racks 501, including rack 501a, in a data center, such as data center 400. The bare metal resources 500 are part of the computing resources 420. The bare metal resources 500 may have the components of the bare metal resource 110 shown in FIG. 1, and may be rack-mountable bare metal servers. In an example, the trusted infrastructure device 150 of FIG. 1 is a rack controller and communicates with a bare metal resource in its rack through out-of-band channel 160 shown in FIG. 1, which may include a wired connection with GPIO pins of the bare metal resource. For example, rack controllers 503, including rack controller 503a on rack 501a, each include the trusted infrastructure device 150. In another example, the trusted infrastructure device 150 may be part of the system manager 430, and the system manager 430 communicates with the bare metal resources 500 to perform the clearance process. The principles described herein are not limited to the number of racks and bare metal resources shown in FIG. 5. Also, the data center may include bare metal resources and/or other types of computing resources that may be provisioned to tenants.

As is discussed above with respect to FIGS. 1 and 2, the trusted infrastructure device 150, which may be part of the rack controller 503a, communicates with the bare metal resource 500a via an out-of-band channel to perform the clearance process on the bare metal resource 500a to place it in the trusted state. The system manager 430 may communicate with the rack controller 503a in response to an event to trigger the clearance process. For example, the event may be a request from a tenant to rent a new bare metal resource, or the event may be an indication that the bare metal resource 500a has become non-operational.

Figure 6:
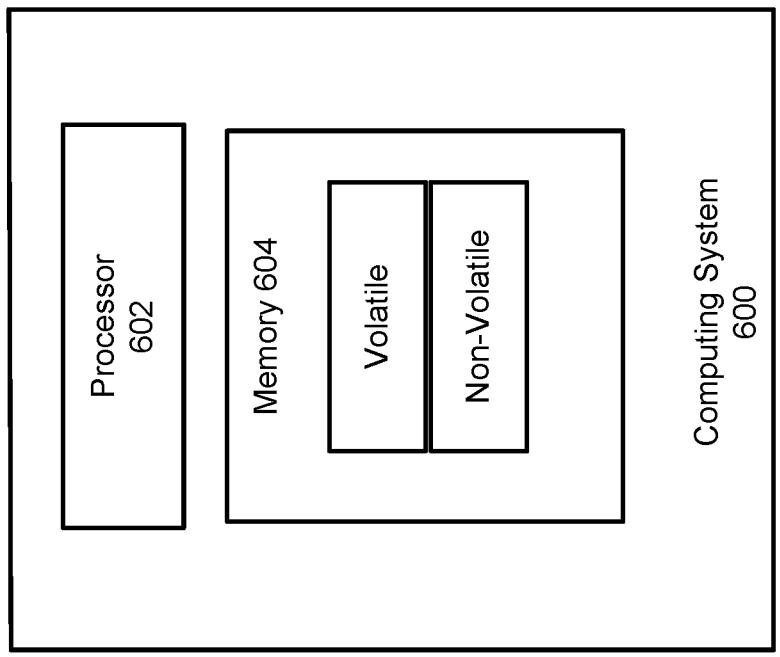
FIG. 6 illustrates a computing system in which principles described herein may be employed, according to an embodiment.

As illustrated in FIG. 6, in its most basic configuration, a computing system 600 typically includes at least one processing unit 602 and memory 604. The memory 604 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description above, embodiments and examples are described with reference to acts that are performed by one or more computing systems. If such acts are implemented in software, one or more processors of the associated computing system that performs the act direct the operation of the computing system in response to having executed computer-executable instructions. For example, such computer-executable instructions, also referred to as machine readable instructions, may be embodied on one or more computer-readable media that form a computer program product. An example of such an operation involves the manipulation of data. The computer-executable instructions (and the manipulated data) may be stored in the memory 604 of the computing system 600. Computing system 600 may also contain communication channels that allow the computing system 600 to communicate with other message processors over, for example, a network. The computing system 600 may represent the architecture for a computer that may host the system manager 430 or the trusted infrastructure device 150. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media. Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a computer. Also, certain steps of methods described above and various operations discussed above may be performed by a processor, microcontroller, or other hardware that can execute machine-readable instructions stored on a non-transitory computer readable medium. Embodiments and examples are described above, and those skilled in the art will be able to make various modifications to the described embodiments and examples without departing from the scope of the embodiments and examples.

What is claimed is:

1. A bare metal resource comprising:
   a trusted portion including a first processing circuit, a clearance manager, and an image repository storing a known good basic input/output system (BIOS); and
   an untrusted portion including a second processing circuit and storage devices storing untrusted software that includes an accessible BIOS,
   wherein, in response to a signal indicating that the bare metal resource is to be reassigned or that the bare metal resource has failed, the first processing circuit in the trusted portion is triggered by the signal to reboot the bare metal resource from the trusted portion and cause the clearance manager in the trusted portion to perform a clearance process on the untrusted portion to place the bare metal resource in a known good state prior to providing access to the bare metal resource, the clearance process including deleting data stored in the storage devices of the untrusted portion and restoring the accessible BIOS in the untrusted portion by replacing the accessible BIOS in the untrusted portion with the known good BIOS from the image repository of the trusted portion, and
   in response to verifying that the clearance process has been completed, the second processing circuit in the untrusted portion reboots the bare metal resource from the untrusted portion using the restored accessible BIOS in the untrusted portion.

2. The bare metal resource of claim 1, wherein the clearance process further includes, deleting the untrusted software, including the accessible BIOS, previously stored in the untrusted portion.

3. The bare metal resource of claim 1, wherein the clearance process further includes loading firmware from the image repository of the trusted portion into a storage device of the storage devices of the untrusted portion.

4. The bare metal resource of claim 1, wherein the clearance process further includes setting a state of a real-time clock to a valid default value.

5. The bare metal resource of claim 1, wherein the untrusted portion is accessible by a new tenant via a network after the bare metal resource is rebooted from the untrusted portion.

6. The bare metal resource of claim 1, wherein the trusted portion and the untrusted portion are not simultaneously operational.

7. The bare metal resource of claim 5, wherein the bare metal resource is communicatively coupled to a trusted infrastructure device in a control plane of a cloud provider via an out-of-band channel, and
   the bare metal resource is configured to receive the signal indicating that the bare metal resource is to be reassigned or that the bare metal resource has failed from the trusted infrastructure device to invoke the clearance process.

8. The bare metal resource of claim 7, wherein the bare metal resource is configured to receive a verification that the clearance process has been completed from the trusted infrastructure device via the out-of-band channel, after the trusted infrastructure device has verified that the clearance process is completed and the bare metal resource is in the known good state, to cause the bare metal resource to reboot from the untrusted portion.

9. The bare metal resource of claim 7, wherein the trusted infrastructure device runs a timer when the clearance process begins to determine whether the clearance process has been completed or is stalled.

10. The bare metal resource of claim 7, wherein the trusted infrastructure device is a rack controller, and the out-of-band channel comprises a wired connection between the rack controller and a connector on a system board of the bare metal resource.

11. A bare metal resource in a pool of computing resources, the bare metal resource comprising:
    a trusted portion including a memory storing a clearance manager, an image repository storing a known good basic input/output system (BIOS), and a first processing circuit to execute the clearance manager, wherein the trusted portion is inaccessible to a new tenant;
    an untrusted portion, accessible to the new tenant when the bare metal resource is assigned to the new tenant, including a second processing circuit and storage device storing untrusted software that comprises an accessible BIOS; and
    a communication interface communicatively coupled to an external device,
    wherein in response to receiving a first signal, from the external device, indicating that the bare metal resource is to be reassigned to the new tenant or that the bare metal resource has failed, the first processing circuit in the trusted portion is triggered by the first signal to reboot the bare metal resource from the trusted portion and cause the clearance manager in the trusted portion to perform a clearance process on the untrusted portion to place the bare metal resource in a known good state prior to providing access to the bare metal resource, the clearance process including deleting data stored in the storage devices of the untrusted portion by a previous tenant and restoring the accessible BIOS in the untrusted portion by replacing the accessible BIOS in the untrusted portion with the known good BIOS from the image repository of the trusted portion, and in response to verifying that the clearance process has been completed, the second processing circuit in the untrusted portion reboots the bare metal resource from the untrusted portion using the restored accessible BIOS in the untrusted portion.

12. The bare metal resource of claim 11, wherein the external device is a trusted infrastructure device of a cloud service provider.

13. The bare metal resource of claim 11, wherein the clearance process further includes deleting the untrusted software, including the accessible BIOS, previously stored in the untrusted portion.

14. The bare metal resource of claim 11, wherein the external device runs a timer to determine whether the clearance process has been completed or is stalled.

15. The bare metal resource of claim 11, wherein the external device is a rack controller communicatively coupled to the bare metal resource via an out-of-band channel, and wherein the out-of-band channel comprises a wired connection between the rack controller and a connector on a system board of the bare metal resource.

16. The bare metal resource of claim 11, wherein the trusted portion and the untrusted portion are not simultaneously operational.

17. The bare metal resource of claim 11, wherein the trusted portion and the untrusted portion are on a motherboard of the bare metal resource.

18. A method comprising:
receiving, from a trusted infrastructure device, a first signal indicating that a bare metal resource is to be reassigned or that the bare metal resource has failed;
in response to the first signal indicating that the bare metal resource is to be reassigned or that the bare metal resource has failed, causing a first processor in a trusted portion of the bare metal resource to reboot the bare metal resource from the trusted portion and causing a clearance manager in the trusted portion to perform a clearance process on an untrusted portion of the bare metal resource to place the bare metal resource in a known good state prior to providing access to the bare metal resource, wherein the clearance process includes deleting data stored in storage devices of the untrusted portion by a previous tenant and restoring an accessible basic input/output system (BIOS) in the untrusted portion by replacing the accessible BIOS in the untrusted portion with a known good BIOS from an image repository of the trusted portion of the bare metal resource; and
in response to verifying that the clearance process has been completed, causing a second processor in the untrusted portion of the bare metal resource to reboot the bare metal resource from the untrusted portion using the restored accessible BIOS in the untrusted portion.

19. The method of claim 18, wherein the trusted infrastructure device transmits a second signal to the bare metal resource indicating that the clearance process has been verified to be completed to cause the second processor to reboot the bare metal resource from the untrusted portion.

20. The method of claim 18, wherein the trusted infrastructure device runs a timer to determine whether the clearance process has been completed.

* * * * *